(12) United States Patent
Schlipf

(10) Patent No.: US 8,941,034 B2
(45) Date of Patent: Jan. 27, 2015

(54) ELECTRIC HEATER AND PROCESS FOR MANUFACTURING AN ELECTRIC HEATER

(75) Inventor: Andreas Schlipf, Tuttlingen (DE)

(73) Assignee: Türk & Hillinger GmbH, Tuttlingen (DE)

( * ) Notice: Subject to any disclaimer, the term of this patent is extended or adjusted under 35 U.S.C. 154(b) by 274 days.

(21) Appl. No.: 12/878,222

(22) Filed: Sep. 9, 2010

(65) Prior Publication Data

US 2011/0056931 A1 Mar. 10, 2011

(30) Foreign Application Priority Data

Sep. 10, 2009 (DE) .......................... 10 2009 040 809

(51) Int. Cl.
| | | |
|---|---|---|
| H05B 3/10 | (2006.01) | |
| B29C 45/27 | (2006.01) | |
| F16L 53/00 | (2006.01) | |
| H05B 3/48 | (2006.01) | |
| H05B 3/58 | (2006.01) | |
| B29C 45/74 | (2006.01) | |

(52) U.S. Cl.
CPC ........... *B29C 45/2737* (2013.01); *F16L 53/008* (2013.01); *H05B 3/48* (2013.01); *H05B 3/58* (2013.01); *B29C 45/74* (2013.01)
USPC ...................................................... 219/548

(58) Field of Classification Search
CPC .... B29C 45/2737; B29C 45/74; B29C 47/82; B29C 47/86; H05B 3/58; H05B 3/48; H05B 3/42; F16L 53/008
USPC ......... 219/535, 541, 544, 549, 538, 546, 552, 219/553, 539, 542, 547, 548; 338/302, 238, 338/239, 241, 230, 233, 235, 240, 242, 243, 338/247; 29/611
See application file for complete search history.

(56) References Cited

U.S. PATENT DOCUMENTS

| | | |
|---|---|---|
| 1,674,488 A | 6/1928 | Tang |
| 3,519,023 A | 7/1970 | Burns, Sr. et al. |
| 4,080,726 A | 3/1978 | Neimanns et al. |

(Continued)

FOREIGN PATENT DOCUMENTS

| | | |
|---|---|---|
| CN | 2905085 Y | 5/2007 |
| DE | 71 10 931 | 11/1971 |

(Continued)

*Primary Examiner* — Dana Ross
*Assistant Examiner* — Joseph Iskra
(74) *Attorney, Agent, or Firm* — McGlew & Tuttle, P.C.

(57) ABSTRACT

An electric heater (10, 30, 40, 50, 60, 70, 100), such as for heating surfaces of components, onto which the electric heater (10, 30, 40, 50, 60, 70, 100) is pushed or placed, has at least one tubular heating element (1, 11, 31, 41, 51, 61, 71, 82, 101), which has a metal jacket, and with at least one contact area. The tubular heating element (1, 11, 31, 41, 51, 61, 71, 82, 101) is at least partly embedded in at least one powder or granular material (2, 32, 42, 52, 62, 72, 102). The powder or granular material (2, 32, 42, 52, 62, 72, 102) abuts against at least parts of the at least one contact area. A process is also provided for manufacturing the electric heater having at least the steps of providing at least one contact area and at least one tubular heating element (1, 11, 31, 41, 51, 61, 71, 82, 101) arranged in relation to the contact area, at least partial embedding the tubular heating element in the powder or granular material (2, 32, 42, 52, 62, 72, 102), which abuts at least partly against the at least one contact area, and compressing at least the powder or granular material (2, 32, 42, 52, 62, 72, 102).

19 Claims, 8 Drawing Sheets

(56) References Cited

U.S. PATENT DOCUMENTS

| | | | |
|---|---|---|---|
| 4,223,208 A * | 9/1980 | Kleinschmidt et al. | 219/530 |
| 4,372,905 A | 2/1983 | Bohman | |
| 5,453,599 A * | 9/1995 | Hall, Jr. | 219/544 |
| 5,777,297 A * | 7/1998 | Gelus et al. | 219/254 |
| 6,782,922 B1 * | 8/2004 | Migliorini et al. | 138/149 |
| 8,022,339 B2 * | 9/2011 | Schlipf | 219/535 |

FOREIGN PATENT DOCUMENTS

| | | | |
|---|---|---|---|
| DE | 72 25 341 | | 1/1977 |
| DE | 27 16 950 | A1 | 1/1978 |
| DE | 31 00 192 | A1 | 12/1981 |
| DE | 32 43 780 | A1 | 5/1984 |
| DE | 35 05 517 | C1 | 9/1986 |
| DE | 8620956 | U1 | 11/1986 |
| DE | 88 00 261 | U1 | 2/1988 |
| DE | 8800261 | * | 2/1988 |
| DE | 42 24 101 | A1 | 1/1993 |
| DE | 200 15 016 | U1 | 12/2000 |
| DE | 199 43 192 | A1 | 4/2001 |
| DE | 201 08 963 | U1 | 9/2001 |
| DE | 201 09 413 | U1 | 9/2001 |
| DE | 201 18 050 | U1 | 2/2002 |
| DE | 10224034 | * | 1/2003 |
| DE | 103 33 206 | A1 | 4/2004 |
| DE | 10333206 | * | 4/2004 |
| DE | 20 2007 010865 | U1 | 10/2007 |
| DE | 202007010865 | * | 10/2007 |
| DE | 20 2008 016439 | U1 | 3/2009 |
| EP | 1 395 085 | A2 | 3/2004 |
| EP | 1 395 085 | B1 | 1/2007 |
| GB | 1 028 398 | A | 5/1966 |

* cited by examiner

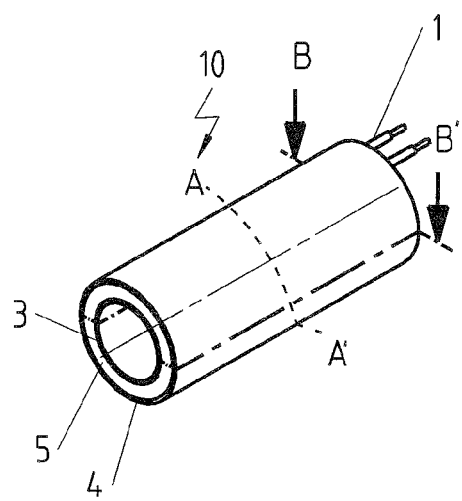
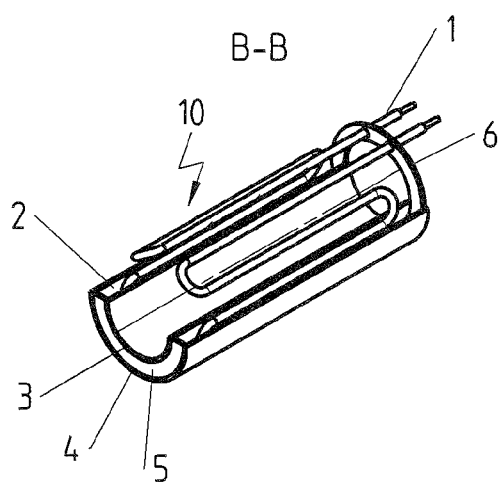
Figure 1a    Figure 1b
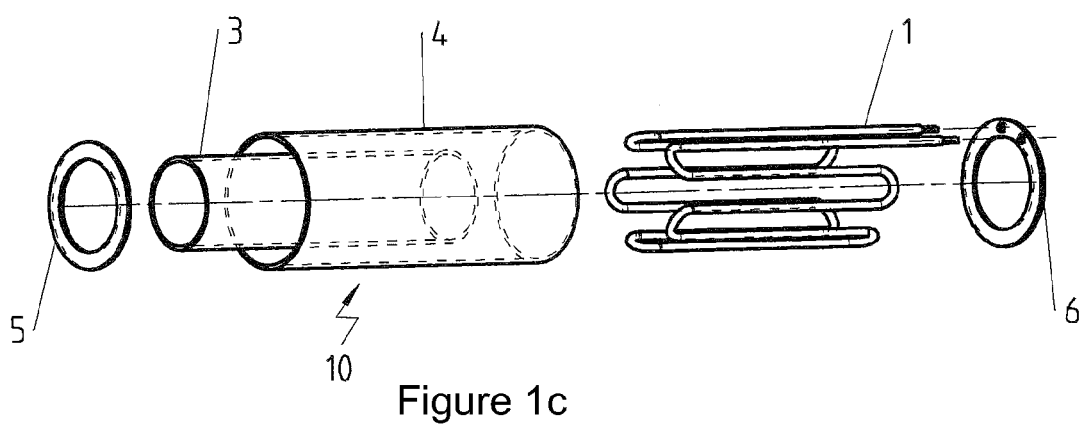
Figure 1c

ELECTRIC HEATER AND PROCESS FOR MANUFACTURING AN ELECTRIC HEATER

CROSS REFERENCE TO RELATED APPLICATIONS

This application claims the benefit of priority under 35 U.S.C. §119 of German Patent Application DE 10 2009 040 809.6 filed Sep. 10, 2009, the entire contents of which are incorporated herein by reference.

FIELD OF THE INVENTION

The present invention pertains to an electric heater especially for heating surfaces of components, onto which the electric heater is pushed or placed, with at least one tubular heating element, which has a metal jacket, and with at least one contact area and relates to a process for manufacturing such an electric heater. Heaters of this type are used, for example, for heating tools, machine parts and devices, and especially plastic spray nozzles. Their application is, however, not limited to this purpose; for example, it is possible to bring fluids to a desired temperature by passing through this type of heater. As an alternative, standing fluids or an expandable wax may also be brought to a desired temperature.

BACKGROUND OF THE INVENTION

Especially popular embodiments of such heaters are those with cylindrical geometry and so-called electric flat heating elements which have an essentially flat geometry, which can be converted into almost any shape by reshaping in some embodiments. Heaters with cylindrical geometry have become known, for example, from DE 201 09 413 U1, EP 1 395 085 B1 or DE 103 33 206 B4.

Flat heating elements have become known, for example, from DE 72 25 341, DE 71 10, 931, DE 201 08 963 U1 and DE 201 18 050 U1.

The prior-art electric heaters usually consist of two contact areas arranged spaced apart from one another, between which is embedded a usually tubular heating element which comprises the actual heat conductor. From the state of the art are known essentially two approaches for achieving an as good as possible decrease in temperature during the embedding, namely the integral casting of the tubular heating element and insertion of the tubular heating element in grooves of a metal surface or insulating material surface. All these approaches have considerable drawbacks, as is explained below.

In the integral casting of the tubular heating element the problem of spontaneous bubble formation arises. This leads to defective decrease in temperature and failure of the heating element.

Insofar as it has been suggested to embed a heat conductor in a body being used as an intermediate layer or a contact area, especially a plate or a tube with recesses or grooves provided therein, the high labor effort that is accompanied by the production of grooves for embedding is unfavorable. Furthermore, it is difficult to guarantee in such an embedding that the thermal contact between the heating element and the insulation material plate is homogeneous, i.e., is equally good everywhere. If, however, this is not achieved, local defective decrease in temperature arises, which ultimately brings with it the failure of the heater.

Insofar as it has been suggested to press the heating element which is designed as a tubular heating element into contact areas made of metal lying on one another, a carrier structure or an enclosing sheet metal, it is problematic that the energy consumption which is needed to achieve a complete enclosing of the heating element is so high that the heating element is severely impaired in terms of its function. Deformations and compressions do arise, which lead to a local change in the ohmic resistance. Furthermore, an uncontrolled shifting of the coils of the heating element may occur, so that the desired temperature profile on the surface of the electric heating element is then no longer achieved. Finally, it has been shown that pressures to be applied are so high that the metal plates begin to flow, which leads to an undefined elongation of the electric heating element.

In addition, this is also not possible for any geometries of the heating element. Especially in tight coils with small pitches, a complete enclosure of the coils does not occur, i.e., a local, defective decrease in temperature, which is accompanied by the risks of failure already mentioned above, does not occur.

SUMMARY OF THE INVENTION

Therefore, the object of the present invention is to provide an electric heater that is manufactured cost-effectively with improved, especially permissible decrease in temperature, and a process for manufacturing such an electric heater.

The electric heater according to the present invention has at least one tubular heating element with a metal jacket, which is at least partly embedded in at least one powder or granular material. Quite generally, such heating elements are one or more heating coils that are embedded in an electrically insulating core, especially a metal oxide core, that is in turn enclosed by a metal jacket, especially a steel jacket. Concrete embodiments are, e.g., generally well-known cartridge-type tubular coils and tubular heating elements.

The powder or granular material abuts at least partly against a contact area. Thus, at least parts of the interface of the powder or granular material are in direct contact with the contact area. The contact area may be especially a metal plate or a metal tube, but its shape can be adapted to the respective requirements of the application. The cross section of the tubular heating element may have any shape, and may especially be circular or in the form of a polygon.

The tubular heating element being "at least partly embedded" means here that the embedding by powder or granular material does not necessarily have to take place about the entire circumference of the tubular heating element. It is also possible and, depending on the field of application, it is meaningful that the tubular heating element is in direct contact, with a part of its circumference, with a contact area that is turned towards the component to be heated or turned away from same.

The embedding of the tubular heating element in a powder or granular material has considerable advantages. Neither is the insertion of a groove in a plate necessary nor is the application of a high pressure necessary so that an extensive pressing in of the tubular heating element takes place, and a casting process is completely avoided. Furthermore, a high degree of homogeneity of the thermal contact between heating element and surroundings is achieved by using a powder. Especially good results can be surprisingly achieved when using granular materials. Granular materials differ from powders by their coarser structure which is expressed as larger particles, and they can be produced especially by particle enlarging processes. Especially preferred here are metal granular materials with whose expansion in any spatial direction leads to an average particle size between 0.1 mm and 1 mm.

In a first embodiment of the present invention, exactly one contact area is present, with which the tubular heating element and the powder or granular material are pressed into a compact unit. Here it should be taken into consideration that markedly lower pressures are needed for pressing the powder or granular material than for pressing a tubular heating element into a metal plate, so that the problems arising there are avoided here.

A unit of this type is obtained, for example, when the contact area is arranged in a die, the powder or granular material is added into the cavities of the die, the heating element is arranged in the powder or granular material in the desired manner, and then the pressing is performed in the die. Another possibility is to first compress the powder and the tubular heating element in a die into a self-supporting module and only then is the contact made with a contact area, which in this case might also be formed by the surface of the module to be heated.

An electric heater that can be reused as an especially material-saving module is obtained by these processes.

In an especially preferred variant of this embodiment, the contact area made of metal is a tube that is entirely or partly surrounded by powder or granular material and the heating element embedded therein, so that the tube is used as inner tube or inner jacket or it encloses the powder or granular material and the heating element embedded therein as outer tube or outer jacket. This geometric arrangement can be utilized for many types of nozzles. Whether the tube is used as inner tube or outer tube depends on the details of the application.

In a second embodiment of the present invention, at least one second contact area made of metal is additionally present and the tubular heating element is arranged between the first and the second contact area made of metal. The powder or granular material abutting against the first contact area made of metal fills the space between the first and second contact areas made of metal, insofar as this is not already filled up by the tubular heating element.

An especially preferred electric heater, which can be used especially for heating such cylindrical components as, e.g., plastic spray nozzles, has an outer metal tube and an inner metal tube that is arranged in the outer metal tube, as well as at least one tubular heating element, which has a metal jacket. The tubular heating element is arranged here between the metal tubes and is embedded at least partly in at least one powder or granular material, with which the area between the outer metal tube and the inner metal tube is filled. Inner and outer metal tubes of equal length, whose longitudinal axes lie essentially parallel to one another, are advantageously used.

A tube in terms of the present invention must not have any opening-free jacket surface, the term tube is used especially even if a recess, e.g., a slit or gap, passes through the jacket surface in the axial direction over its entire length, i.e., the structure can be created, e.g., by applying a constant curvature to a metal band. Likewise, this term is not very limited in terms of the cross section of the tube, this [tube] may especially be not only round, but also elliptical, bent or polygonal. Also, a variation in cross section and especially diameter is included, such that conically running tubes are likewise defined under the generic term "tube."

When symmetrical heating is desired, it is especially advantageous if the outer metal tube and the inner metal tube are arranged concentric to one another.

If the electric heater shall be used as a flat heating element, one advantageous embodiment of the contact areas provides that the at least two contact areas are formed by two metal plates arranged parallel to one another and spaced apart from one another.

A further adaptation to the shape of the component to be heated can be obtained, on the one hand, by a reshaping of the above-defined flat heating element; however, it is basically also possible to provide metal profiles already shaped as desired as contact areas.

It may be advantageous if the first and second contact areas are firmly connected to one another by at least one other contact area, especially milled from a part or drawn from a metal sheet.

Heating elements to be used advantageously consist of an arched or coiled, preferably compressed cartridge-type tubular coil or an arched or coiled, preferably compressed tubular heating element. They may also be coiled into the tubular element as a tubular coil.

The selection of the powder or granular material can be adapted to the needs of the application. It is possible to use powder or granular materials made of metal, and especially made of aluminum, brass or copper, but also metal oxides, quartz sand or ceramic compounds. It may be especially advantageous to compress the flat heating element entirely or partly. Consequently, an even better heat conduction, especially with regard to homogeneity, is achieved.

Considerable shaping and adaptation possibilities to the respective application are especially given in the electric heaters described here. Both the contact areas and the powder and granular material may consist of the same material, as a result of which an especially uniform heat conduction is guaranteed. However, contact areas made of various materials may also be provided, for example, when an especially good heat conductivity is relevant on the side of the electric heater facing the component to be heated, but at the same time certain requirements on the mechanical stability of the electric heater are to be met. This is especially the case when a flat heating element is intended to be reshaped later, as occurs, for example, when it will be placed about a cylindrical component to be heated as a ring sleeve and is bent for this purpose. A further degree of freedom is hereby created in that the powder or granular material used for filling may be selected according to such considerations.

The electric heater may advantageously be adapted in its geometric embodiment to the geometry of the component to be heated. It may especially provide an inner bore with radial symmetry or be radially symmetrical overall. In this embodiment, it is also possible to heat conical components. However, it may also be advantageous for a cylindrical inner bore to be present or for the entire heater to be cylindrical or for an inner bore or the entire heater to have an oval, angular, arched, bent or elliptical geometry.

The guiding of the tubular heating element from the electric heater likewise easily depends on the needs of the respective arrangement to be heated. It may be advantageous when at least one end of the tubular heating element is guided out of the heater axially, tangentially or radially.

For the specific adjustment of temperature profiles to the surface of the electric heating element facing the component to be heated, not only the shaping of the tubular heating element mounted therein, especially, e.g., its coiling, but also a variation of the materials used or of their properties, e.g., their thickness, may be used.

Depending on the application it may, moreover, be advantageous to protect the powder or granular material used against environmental effects by surrounding it on all sides by contact areas. To this end, a one-piece or multipiece frame made of metal, mica, plastic or ceramic that defines the space filled with the at least one powder or granular material in the directions of extension of the at least two contact areas may especially be used. In the simple case of an arrangement formed from two tubes, this is simply formed by two plates or rings. However, it is, for example, also possible to achieve such a spatial definition by means of a closure using a sealing compound, and especially silicone rubber, epoxy resin or a ceramic cement compound.

Further advantages arise when the first and/or second contact areas consist of an extrusion-molded part, especially an extrusion-molded part made of aluminum.

Finally, it is advantageous for some applications when the electric heater is filled with a plurality of different metal powders, and especially with a plurality of different metal powders which are arranged in different chambers of the electric heater. Such chambers may be created, for example, by providing partitions between the contact areas.

The achieved temperature profile can be further varied by providing a plurality of tubular heating elements. It is especially advantageous when a cartridge-type tubular coil, which is subsequently compressed after bending or coiling, and especially subsequently compressed onto a mandrel, is used as a tubular heating element.

An especially good heat conduction can be achieved, if the electric heater is compressed, whereby an inner, tubular jacket surface is provided with a setting plug, especially with a cylindrical setting plug when compressing during the radially reducing press process.

If the outer metal tube and the inner metal tube are provided with a recess, which extends over the entire length of the metal tube, an especially cost-effective manufacture of the electric heater by reshaping or bending a flat heating element is possible. It is advantageous if the outer metal tube consists of a drawn metal tube or if the outer metal tube consists of an extruded section, preferably of an aluminum extruded section.

Especially preferred dimensions of the inner metal tube are present if an inner contour of the inner metal tube has smaller dimensions than the component to be heated and thus can be clamped onto this. As an alternative, it is also helpful to arrange clamping elements on the outer metal tube, with which the heater can be clamped onto the component to be heated. When a jacketed thermometer or thermocouple is, moreover, guided through the gap, the replacement of the thermometer in case of its failure is possible in a simple and inexpensive manner.

The process according to the present invention is used for the manufacture of an electric heater for heating surfaces of components, onto which the electric heater is pushed or placed in its use, i.e., for the manufacture of electric heaters, which are not designed as an integral device that is firmly connected to the component to be heated, but can be arranged subsequently at the device or can be removed from the device. It has at least the following steps: A contact area and a tubular heating element arranged in relation to same are provided, and the tubular heating element is at least partly embedded in a powder or granular material. It is does not matter here whether the contact area is provided first, the tubular heating element is provided first, or both are provided at the same time. It is also possible that further steps are carried out between the providing of the contact area and the providing of the tubular heating element, e.g., the providing of a second contact area and the connection of the first and the second contact areas. Furthermore, it is possible that the powder or granular material is added entirely or partly already before the providing of the tubular heating element.

The tubular heating element being arranged in relation to the contact area means that it is located in a spatial area or half space, which is defined by the contact area.

Moreover, the tubular heating element is embedded in a powder or granular material, which, after embedding, abuts at least partly against the at least one contact area. This may happen when the powder or granular material is added before the tubular heating element, for example, by pressing or by burying the tubular heating element in the powder or granular material, when it is provided partly before the tubular heating element, or when it is provided after the tubular heating element, for example, subsequently by feeding the powder or granular material.

In a further step, at least the compression of at least the powder or granular material takes place. It is, therefore, especially also possible to compress the powder or granular material with the tubular heating element into a self-supporting module and to make the connection to the contact area only subsequently.

This procedure makes it possible to simply and cost-effectively manufacture an electric heating element, which both guarantees good heat dissipation and forms a flexible, usable module.

In an especially preferred embodiment of the process this module is formed by the contact area for providing being arranged in a die, the powder or granular material being added in the cavities of the die, the heating element being arranged in the powder or granular material in the desired manner, and then the compression being carried out in the die. By means of suitable compression, a largely self-supporting powder body with embedded tubular heating element is obtained, which is then pushed onto the components to be heated and can be brought into good thermal contact with them possibly by further compression, e.g., by hammering. Of course, electric heaters which have more than one contact area may also be manufactured by means of the described use of a die.

In a second especially preferred embodiment of the process which is especially well suited for the manufacture of electric heating elements for cylindrical components, an inner metal tube is inserted into an outer metal tube and a bottom plate is connected to the inner and outer metal tubes for providing the at least one contact area. For providing the tubular heating element, the tubular heating element is inserted between the inner metal tube and the outer metal tube. For the at least partial embedding of the tubular heating element in a powder or granular material, the volume between the inner metal tube and the outer metal tube is then filled with the powder or granular material, preferably while shaking.

The present invention is explained below in greater detail based on drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1a is a perspective view, viewed from the top corner, showing the first exemplary embodiment of the present invention;

FIG. 1b is a sectional view of the exemplary embodiment from FIG. 1a, cut along the line B-B';

FIG. 1c is an exploded view of the electric heater from FIG. 1a, with omission of the powder or granular material;

FIG. 4a is a sectional view of a sixth exemplary embodiment of the present invention, corresponding to a section along the line A-A' shown in FIG. 1a;

FIG. 4b is a sectional view of a seventh exemplary embodiment of the present invention, corresponding to a section along the line A-A' shown in FIG. 1a;

DESCRIPTION OF THE PREFERRED EMBODIMENTS

Figure 2A:
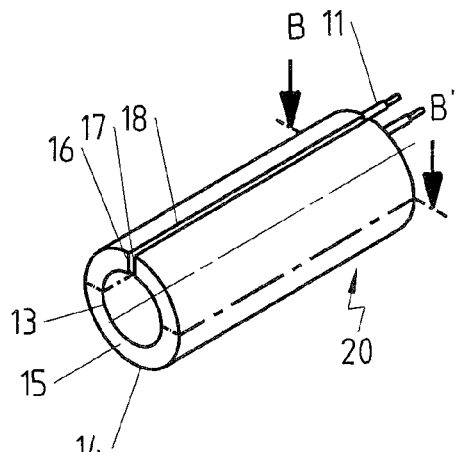
FIG. 2a is a perspective view showing a second exemplary embodiment of the present invention in an embodiment with continuous recess in the axial direction.

Referring to the drawings in particular, in all figures identical reference numbers are used for identical components of identical exemplary embodiments.

FIG. 1a shows the view of a first exemplary embodiment of the present invention, viewed from the top corner. The electric heater 10 has an inner metal tube 3 and an outer metal tube 4 which are arranged lying concentric in one another and are of equal length. Furthermore, one sees the ends of a tubular heating element 1, which, as can be clearly seen in FIGS. 1b and 1c, is arranged in a meander-shaped manner in the space formed by the inner metal tube 3 and the outer metal tube 4. Furthermore, in FIG. 1a, a tubular, optional bottom plate 5 is provided, which may consist, e.g., of metal, mica, plastic or ceramic. As an alternative, the space between the inner metal tube 3 and the outer metal tube 4 can be sealed by a sealing compound, e.g., with a silicone rubber, an epoxy resin or a ceramic cement compound. A suitably compressed powder or granular material 2 may, however, also be self-supporting, especially the volume is kept temporarily closed, e.g., by the wall of a die, during the compression, so that sealing of the space between inner metal tube 3 and outer metal tube 4 is no longer necessary in the finished electric heater 10.

FIG. 1b shows a sectional view of the exemplary embodiment from FIG. 1a, cut along the line B-B'. Besides the already described meandering course of the tubular heating element 1, above all the embedding of the tubular heating element 1 in the powder or granular material 2 is readily seen in this view. Furthermore, a tubular end plate 6 on the connection side, through which the tubular heating element 1 is guided into or out of the space between the inner metal tube 3 and the outer metal tube 4 is seen. Also, the end plate 6 is optional for the reasons already stated above; it may consist of the same materials as the bottom plate.

FIG. 1c shows an exploded view of the electric heater 10 from FIG. 1a with omission of the not shown powder or granular material 2. A possible procedure for the manufacture of the electric heater 10 can readily be explained based on this figure: The inner metal tube 3 is inserted into the outer metal tube 4. The bottom plate 5 is connected, e.g., bonded or welded, to both metal tubes. The tubular heating element 1 is inserted between inner metal tube 3 and outer metal tube 5. The volume between these tubes is then filled with the powder or granular material, preferably while shaking, and the end plates 6 on the connection side are put on and connected to inner metal tube 3 and outer metal tube 4. The entire arrangement can be subsequently compressed.

FIG. 2a shows a second exemplary embodiment of the present invention in an embodiment with continuous recess in the axial direction. The electric heater 20 has an inner metal tube 13 and an outer metal tube 14, which are arranged lying concentric in one another and are of equal length. However, both the inner metal tube 13 and the outer metal tube 14 are passed through by a recess 18 passing through the two metal tubes 13, 14 along their entire axial extension. Furthermore, the inner metal tube 53 and the outer metal tube 54 are connected to one another by closing surfaces 16, 17 at the edges of the recess 58 oriented in the axial direction.

Furthermore, one sees the ends of a tubular heating element 11, which, not shown here, is arranged exactly as in the first exemplary embodiment meandering in the space formed by the inner metal tube 13 and the outer metal tube 14. Furthermore, in FIG. 2a again, an optional, likewise slotted bottom plate 15 is provided, which may consist, e.g., of metal, mica, plastic or ceramic. Likewise not shown is the embedding of the tubular heating element 11 in the powder or granular material. The embodiment according to FIG. 2a may be manufactured especially by means of reshaping a flat heating element, which is an especially effective method of manufacture.

Figure 2B:
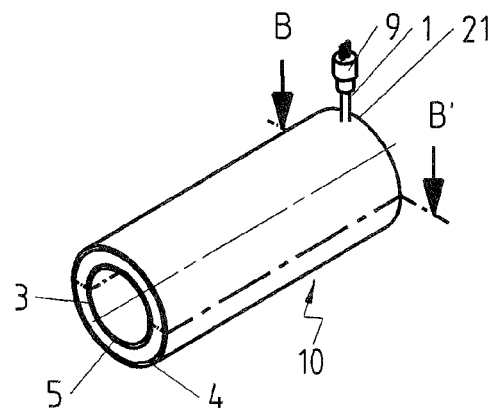
FIG. 2b is a perspective view showing the exemplary embodiment according to FIG. 1a with a first variation of the connection of the tubular heating element.
Figure 2C:
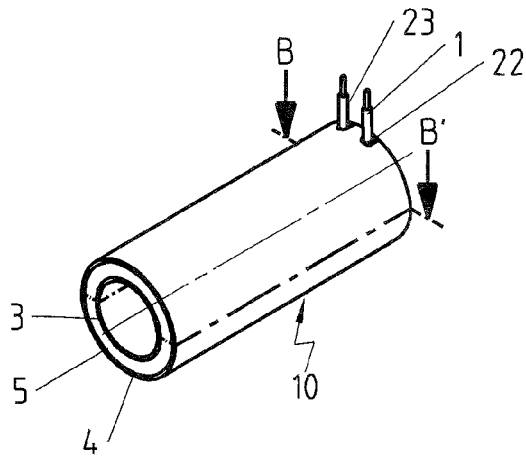
FIG. 2c is a perspective view showing the exemplary embodiment according to FIG. 1a with a second variation of the connection of the tubular heating element.

FIGS. 2b and 2c show further possibilities for the connection of the tubular heating element 1 in the exemplary embodiment according to FIG. 1a. In FIG. 2b a connection plug 9, which makes the tubular heating element guided through the recess 21 radially from the space between the inner metal tube 3 and the outer metal tube 4 contactable, is provided. FIG. 2c likewise shows a radial guiding of the tubular heating element 1 through two recesses 22, 23.

Figure 2D:
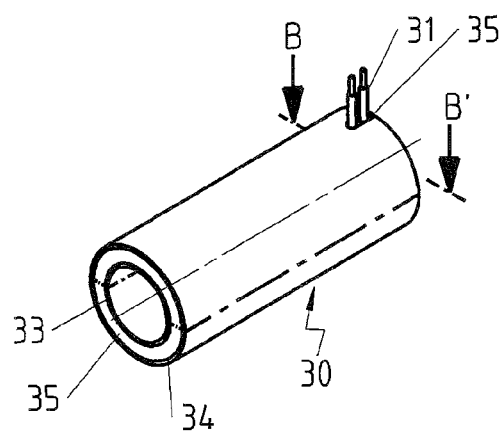
FIG. 2d is a perspective view showing a third exemplary embodiment of the present invention with a coiled tubular heating element.
Figure 2E:
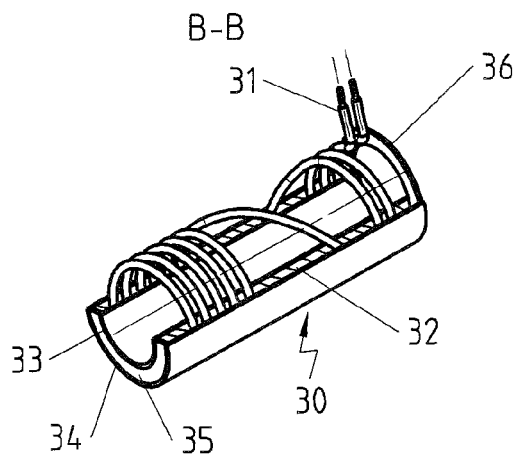
FIG. 2e is a sectional view of the exemplary embodiment from FIG. 2d, cut along the line B-B'.
Figure 2F:
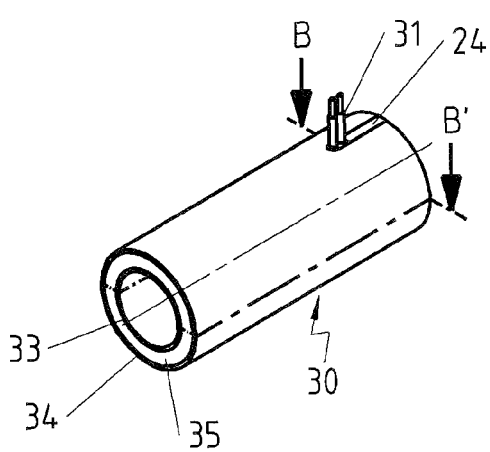
FIG. 2f is a perspective view showing the exemplary embodiment according to FIG. 2d with a variation of the connection of the tubular heating element.

FIGS. 2d through 2f show two variants of a third exemplary embodiment of the present invention which especially has a coiled tubular heating element 31, as can be seen FIG. 2e.

FIG. 2d shows the view of the third exemplary embodiment of the present invention, viewed from the top corner. The electric heater 30 has an inner metal tube 33 and an outer metal tube 34, which are arranged lying concentric in one another and are of equal length. Furthermore, one sees the ends of a tubular heating element 31, which, as can be clearly seen in FIG. 2e, is arranged coiled in the space formed by the inner metal tube 33 and the other metal tube 34. Furthermore, in FIG. 2d again, an optional bottom plate 35 is provided. The outer metal tube 34 has an oblong recess 35, through which the tubular heating element 31 is guided into or out of the space between the inner metal tube 33 and the outer metal tube 34.

FIG. 2e shows a sectional view of the exemplary embodiment from FIG. 2d, cut along the line B-B'. Besides the already described coiled course of the tubular heating element 31, above all the embedding of the tubular heating element 31 in the powder or granular material 32 is readily seen in this view. Furthermore, an optional end plate 36 on the connection side can be seen.

In the variant of the exemplary embodiment from FIG. 2d shown in FIG. 2f the tubular heating element 31 is guided closer to the middle of the lengthwise extension of the outer metal tube 33 through its wall. This happens by means of an oblong recess, which is then sealed with the cover plate 24 and for this reason cannot be seen in FIG. 2f.

Figure 2G:
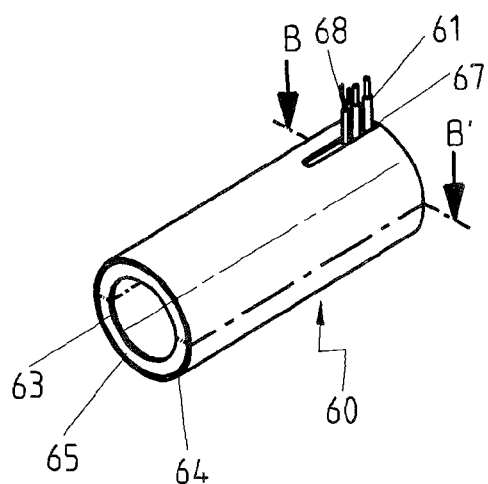
FIG. 2g is a perspective view showing a fourth exemplary embodiment of the present invention with a coiled tubular heating element and a guided thermocouple accompanying the coil.

FIG. 2g shows the view of the fourth exemplary embodiment of the present invention, viewed from the top corner. The electric heater 60 has an inner metal tube 63 and an outer metal tube 64, which are arranged lying concentric in one another and are of equal length. Furthermore, one sees the ends of a tubular heating element 61, which, as can be clearly seen in FIG. 2e, is arranged coiled in the space formed by the inner metal tube 63 and the other metal tube 64. Furthermore, a thermocouple 68 likewise has a coiled course. Furthermore, in FIG. 2g again, an optional bottom plate 65 is provided. The other metal tube 64 has an oblong recess 67, through which the tubular heating element 61 and the thermocouple 68 are guided into or out of the space between the inner metal tube 63 and the outer metal tube 64.

Figure 2H:
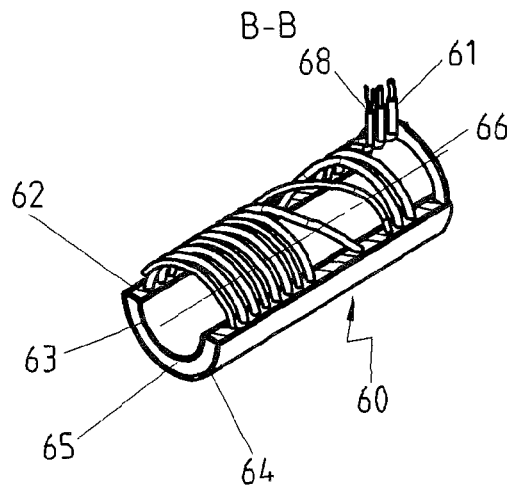
FIG. 2h is a perspective view showing a sectional view of the exemplary embodiment from FIG. 2g, cut along the line B-B'.

FIG. 2h shows a sectional view of the exemplary embodiment from FIG. 2g, cut along the line B-B'. Besides the already described coiled course of the tubular heating element 61 and of the thermocouple 68, above all the embedding of the tubular heating element 61 in the powder or granular material is seen in this view. Furthermore, an optional end plate 66 on the connection side is seen.

Figure 2I:
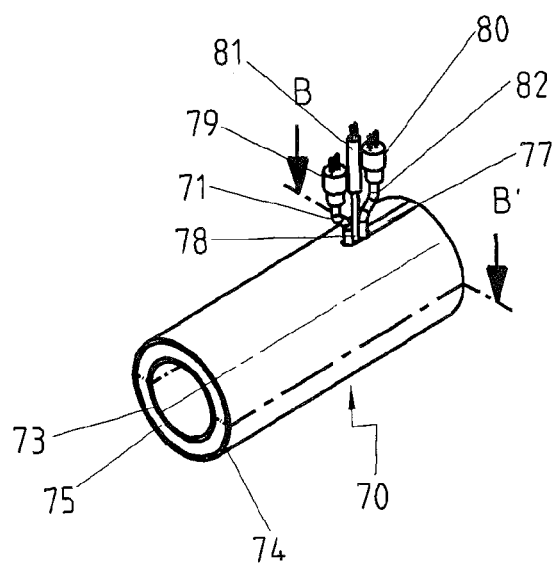
FIG. 2i is a perspective view showing a fifth exemplary embodiment of the present invention with two coiled tubular heating elements and a guided thermocouple accompanying the coil.
Figure 2K:
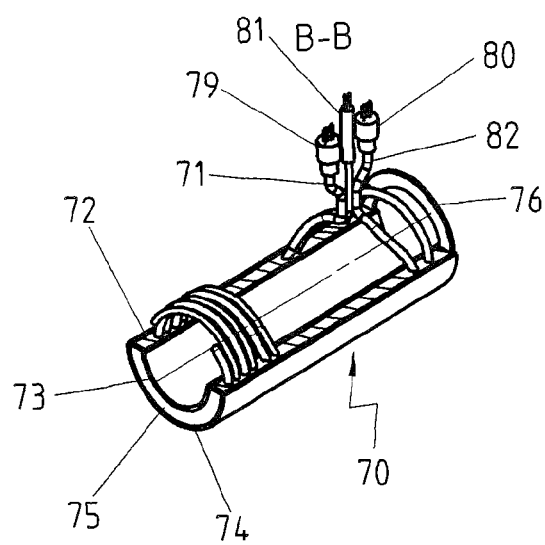
FIG. 2k is a sectional view of the exemplary embodiment from FIG. 2i, cut along the line B-B'.

FIG. 2i shows the view of a fifth exemplary embodiment of the present invention, viewed from the top corner. The electric heater 70 has an inner metal tube 73 and an outer metal tube 74, which are arranged lying concentric in one another and are of equal length. Furthermore, one sees the ends of a first tubular heating element 71 and of a second tubular heating element 82, which are provided with connection plugs 79 and 80, as well as the end of a thermocouple 78 provided with the connection plug 81. The tubular heating elements 71, 82 and the thermocouple 78 are, as can be clearly seen in FIG. 2k, arranged coiled in the space formed by the inner metal tube 73 and the outer metal tube 74. Furthermore, an optional bottom plate 75 is also provided in FIG. 2i. The outer metal tube 74 has an oblong recess 77, through which the tubular heating elements 71, 82 and the thermocouple 81 are guided into or out of the space between the inner metal tube 73 and the outer metal tube 74.

FIG. 2h shows a sectional view of the exemplary embodiment from FIG. 2g, cut along the line B-B'. Besides the already described coiled course of the tubular heating elements 71, 82 and of the thermocouple 78, above all the embedding of the tubular heating elements 71, 82 in the powder or granular material 72 is readily seen in this view. Furthermore, an optional end plate 76 on the connection side is seen.

Figure 3A:
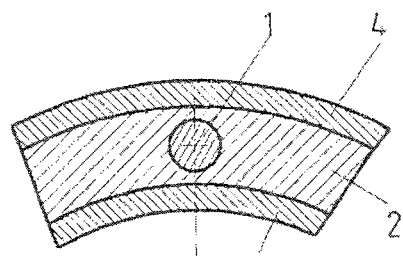
FIG. 3a is a sectional view showing one of different possibilities of embedding the tubular heating element according to the present invention.
Figure 3B:
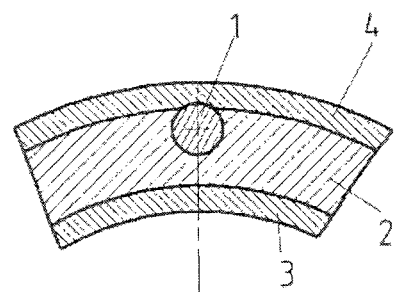
FIG. 3b is a sectional view showing one of different possibilities of embedding the tubular heating element according to the present invention.
Figure 3C:
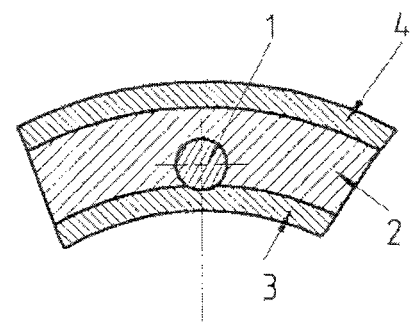
FIG. 3c is a sectional view showing one of different possibilities of embedding the tubular heating element according to the present invention.
Figure 3D:
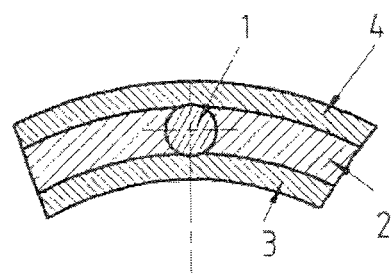
FIG. 3d is a sectional view showing one of different possibilities of embedding the tubular heating element according to the present invention.
Figure 3E:
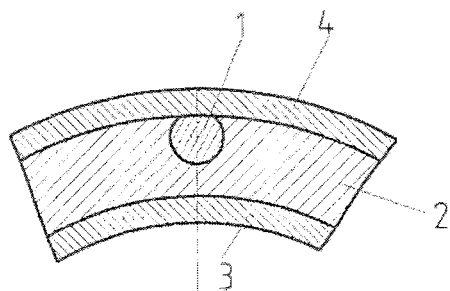
FIG. 3e is a sectional view showing one of different possibilities of embedding the tubular heating element according to the present invention.
Figure 3F:
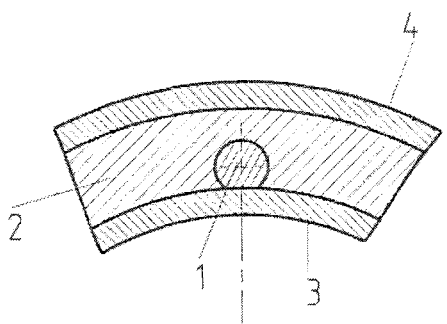
FIG. 3f is a sectional view showing one of different possibilities of embedding the tubular heating element according to the present invention.
Figure 3G:
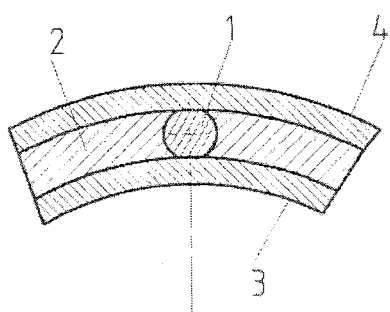
FIG. 3g is a sectional view showing one of different possibilities of embedding the tubular heating element according to the present invention.

Based on the exemplary embodiment from FIG. 1a, FIGS. 3a through 3g schematically show once again the different possibilities of embedding the tubular heating element 1 in the powder or granular material 2 in terms of the present invention: The heating element 1 is always completely surrounded either by powder or granular material 2 or by powder or granular material 2 as well as inner metal tube and/or outer metal tube 4. In FIGS. 3b and 3e, it has direct contact with the outer metal tube 4, in FIGS. 3c and 3f it has direct contact with the inner metal tube 3 and in FIGS. 3d and 3g it has direct contact with the inner metal tube 3 and with the outer metal tube 4. In FIG. 3a, the tubular heating element 1 is only surrounded by powder or granular material 2.

As is directly clear from a comparison of FIGS. 3b and 3e, 3c and 3f as well as 3d and 3g, when there is a contact between the tubular heating element 1 and the inner metal tube 3 and/or the outer metal tube 4, this can be established by a sectionally flat abutting of the tubular heating element 1 against the unchanged profile of the respective metal tube 3, 4, but also by a sectionally partial embedding of the tubular heating element 1 in the respective metal tube 3, 4. The variants shown show two extremes, intermediate forms are likewise conceivable. A punctiform or linear contact between the tubular heating element 1 and the inner metal tube 3 and/or the outer metal tube 4 is also especially conceivable.

Figure 4A:
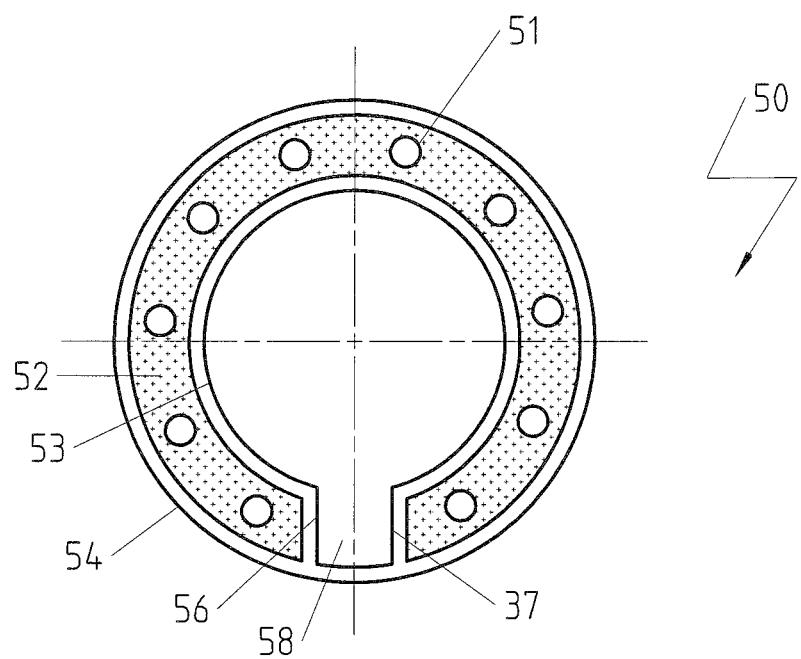

FIG. 4a shows a sectional view of a sixth exemplary embodiment of the present invention, corresponding to a section through the cylindrical body of the electric heater along the line A-A' shown in FIG. 1a. The electric heater 50 also has a tubular heating element 51 passing through it in a meandering manner, which is arranged between the inner metal tube 53 and the outer metal tube 54. This embodiment is characterized in that the inner metal tube 53 is passed through by a recess 58 moving over the entire axial extension and thus the entire length of the metal tube. In the example shown, optional closing surfaces 56 and 57 are provided, which connect the inner metal tube 53 and outer metal tube 54 to one another at the edges of the recess 58 oriented in the axial direction. The chamber forming is filled with powder or granular material 52, into which the tubular heating element 51 is embedded. This embodiment is especially useful when a radial asymmetrical heating of the component to be heated is necessary, since a desired orientation of this embodiment can be easily predetermined by a burr provided on same.

Figure 4B:
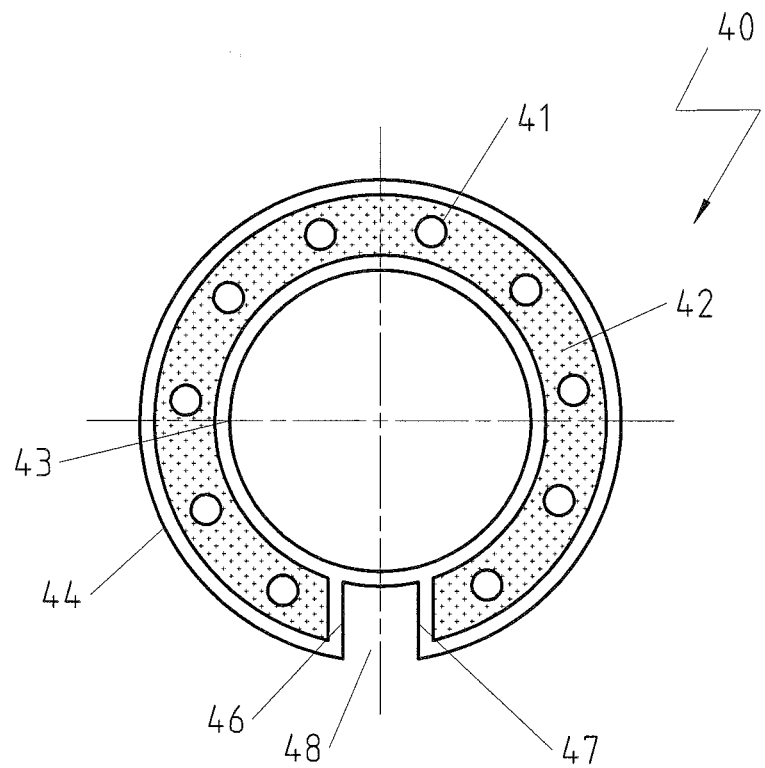

FIG. 4b shows a sectional view of a seventh exemplary embodiment of the present invention, corresponding to a section through the cylindrical body of the electric heater along the line A-A' shown in FIG. 1a. The electric heater 40 also has a tubular heating element 41 passing through it in a meandering manner, which is arranged between the inner metal tube 43 and the outer metal tube 44. This embodiment is characterized in that the outer metal tube 44 is passed through by a recess 48 moving over the entire axial extension and thus the entire length of the metal tube. In the example shown, optional closing surfaces 46 and 47 are provided, which connect the inner metal tube 43 and the outer metal tube 44 to one another at the edges of the recess 48 oriented in the axial direction. The chamber forming is filled with powder or granular material 52, into which the tubular heating element 41 is embedded. This embodiment is especially useful when a concealed routing of cables or supply lines is desired.

Figure 5:
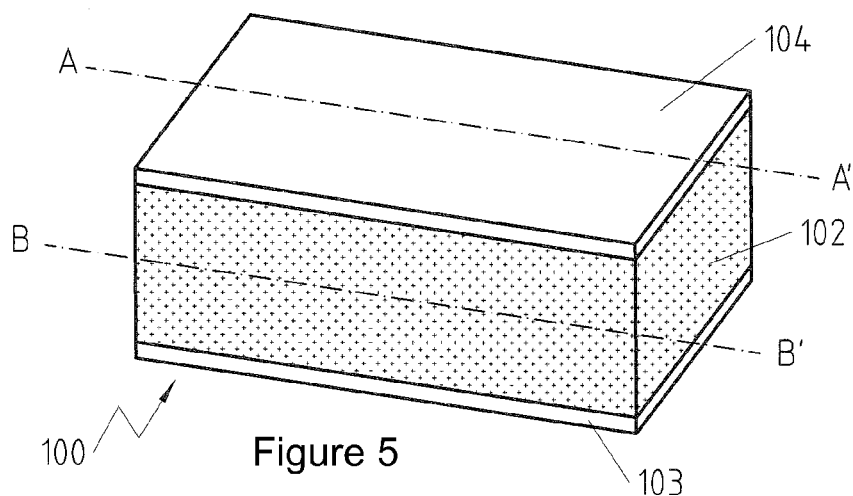
FIG. 5 is a perspective view showing an eighth exemplary embodiment of the present invention, viewed from the top corner.

FIG. 5 shows as an eighth embodiment an electric heater 100 in an embodiment as a flat heating element with a first metal plate 103 and a second metal plate 104 as contact areas. In the space between the first metal plate 103 and the second metal plate 104 is, as can be seen, e.g., in FIG. 6, arranged a tubular heating element 101, which, however, as cannot be seen in FIG. 5, since, as is clear in FIG. 8, only its connection area 106 with connection plug 109 protrudes from the electric heater 100 and this lies on the side facing away from the observer. The tubular heating element 101 is embedded in a powder or granular material 102, which fills the space between the first metal plate 103 and the second metal plate 104. In the embodiment shown here, no frame is provided; when the powder or granular material 102 is compressed, this is not needed to keep the material in its place.

Figure 6:
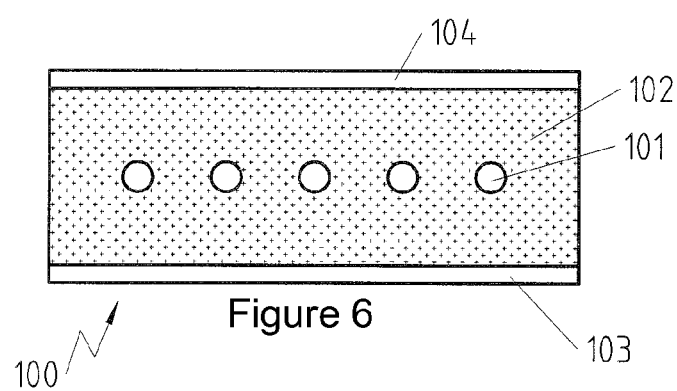
FIG. 6 is a sectional view of the exemplary embodiment from FIG. 5, cut along the line A-A'.
Figure 8:
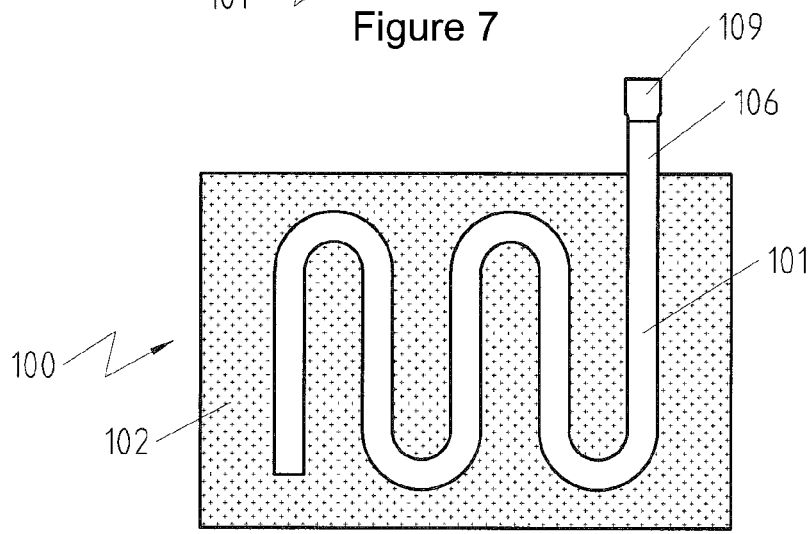
FIG. 8 is a sectional view of the exemplary embodiment from FIG. 5, cut along the line B-B'.

Moreover, the tubular heating element 101 embedded in the powder or granular material 102 can be seen in the view of FIG. 6, which, as clearly emerges from FIG. 8, runs in coils through the electric heater 100.

Figure 7:
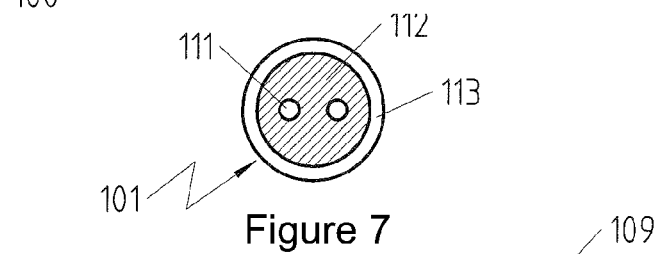
FIG. 7 is a sectional view showing a detailed enlargement of the tubular heating element.

FIG. 7 shows an enlarged section through the tubular heating element 101, on the basis of which a typical setup of the tubular heating element 101 can be completed. The tubular heating element 101, which can be used in this embodiment not only in flat heating elements, but also in all other electric heaters and is preferably used, has a heat conductor 111, which is embedded in a central magnesium oxide core 112, surrounded by a tubular steel jacket 113. Basically, other materials for the jacket and the electrically insulating core are also conceivable.

Furthermore, it can be seen in the view of FIG. 8 that the tubular heating element 101 in this case protrudes tangentially from the electric heater 100 with its connection area 106 terminated by the connection plug 109. Basically, a different, for example, a normal guiding of the connection area 106 from the electric heater 100 is also possible.

Figure 9:
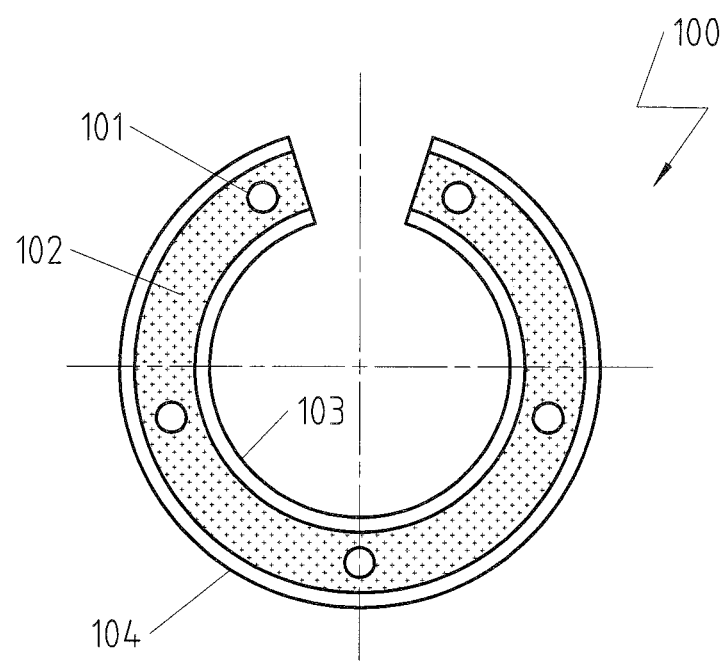
FIG. 9 is a sectional view showing the view from FIG. 6 of an exemplary embodiment according to FIG. 5 reshaped into an almost closed ring element after compressing the flat heating element.

Based on FIG. 9, it is clear that an electric heater 100 according to the present invention, which is embodied as a flat heating element, can be easily adapted to other desired shapes by means of reshaping, here an almost closed ring element, which can be used, for example, for the heating of a cylindrical component. Precisely due to the wide variety of possible material combinations for powder or granular material 2, first contact area and second contact area, such a reshapability, among other things, can be especially readily set with the electric heater 100 according to the present invention. However, when a reshaping is intended, it is recommended to provide a frame, which is firmly connected to the first metal plate 103 and the second metal plate 104.

While specific embodiments of the invention have been described in detail to illustrate the application of the principles of the invention, it will be understood that the invention may be embodied otherwise without departing from such principles.

APPENDIX

List of Reference Numbers

1, 11, 31, 41, 51, 61, 71, 82, 101 Tubular heating element
2, 32, 42, 52, 62, 72, 102 Powder or granular material
3, 13, 33, 43, 53, 63, 73 Inner metal tube
103 First metal plate
4, 14, 34, 44, 54, 64, 74 Outer metal tube
104 Second metal plate
5, 15, 35, 65, 75 Bottom plate
6, 36, 66, 76 Connection side end plate
106 Connection area
9, 79, 80, 81, 109 Connection plug
10, 30, 40, 50, 60, 70, 100 Electric heater
16, 17, 46, 47, 56, 57 Closing surface
18, 21, 22, 23, 48, 58, 67, 77 Recess
68, 78 Thermocouple
24 Cover plate
111 Heat conductor
112 Magnesium oxide core
113 Steel mantel

What is claimed is:

1. An electric heater for heating surfaces of components, onto which the electric heater is pushed or placed, the electric heater comprising:
at least one tubular heating element having an outer tubular metal jacket and one or more heat emitting parts embedded in an electrically insulating core and enclosed by the outer tubular metal jacket;
an outer metal tube;
an inner metal tube arranged in the outer metal tube, a wall of the outer tube forming at least one first contact area made of metal, a wall of the inner tube forming at least one second contact area made of metal and at least one other contact area milled from a part or drawn from a sheet metal, the other contact area connecting the first contact area firmly to the second contact area, the outer metal tube and the inner metal tube having a recess extending in an axial direction, the tubular heating element being arranged between the first contact area made of metal and the second contact area made of metal; and
at least one powder or granular material, the tubular heating element being at least partly embedded in the at least one powder or granular material, wherein:
a space between the first contact area made of metal and the second contact area made of metal, in which the tubular heating element is arranged, wherein the space is filled with the powder or granular material, the powder or granular material abutting against at least parts of the first contact area made of metal and the second contact area made of metal and the at least one tubular heating element is in direct mechanical contact and is in direct electrical contact with at least one of the first contact area made of metal and the second contact area made of metal.

2. An electric heater in accordance with claim 1, wherein an inner bore or the entire electric heater has an oval, angular, arched, bent, or elliptical geometry.

3. An electric heater in accordance with claim 1, wherein the at least two contact areas made of metal are joined together from different sheet metal or tube segments made of identical or different materials.

4. An electric heater in accordance with claim 1, wherein plates or rings made of metal, mica, plastic or ceramic are arranged at one or both ends of the tubular contact areas made of metal.

5. An electric heater in accordance with claim 1, wherein one or both ends of the tubular contact areas made of metal are sealed with a sealing compound, silicone rubber, epoxy resin or a ceramic cement compound.

6. An electric heater in accordance with claim 1, wherein a plurality of different metal powders are arranged in various chambers of the electric heater.

7. An electric heater in accordance with claim 1, wherein the outer metal tube recess and the inner metal tube recess each extend over an entire axial length thereof.

8. An electric heater in accordance with claim 1, wherein a jacketed thermometer or thermocouple is guided through the recess.

9. An electric heater for heating surfaces of components, onto which the electric heater is pushed or placed, the electric heater comprising:
- a heating element in a from of a tubular heating element comprising one or more heating coils embedded in an electrically insulating core enclosed by a tubular metal jacket;
- an outer metal tube with an outer wall with an outer axially extending recess that extends over an entire axial length of the outer wall, the outer wall defining a first contact area made of metal;
- an inner metal tube with an inner wall with an inner axially extending recess that extends over an entire axial length of the inner wall, the inner metal tube being arranged in the outer metal tube, the inner metal tube having a wall with an interior surface defining a second contact area made of metal and with an exterior surface defining a receiving space to receive at least a part of the component to be heated;
- a first axially extending closing surface connecting the outer wall to the inner wall at the edges of the recesses;
- a second axially extending closing surface connecting the outer wall to the inner wall at the edges of the recesses, the first axially extending closing surface and the second axially extending closing surface defining other contact areas connecting the first contact area firmly to the second contact area, the tubular heating element being arranged in a space between the first contact area made of metal and the second contact area made of metal; and
- at least one powder or granular material, the tubular heating element being at least partly embedded in the at least one powder or granular material, wherein:
- the space between the first contact area made of metal and the second contact area made of metal, in which the tubular heating element is arranged, is filled with the powder or granular material, the powder or granular material abutting against at least parts of the first contact area made of metal and the second contact area made of metal; and
- the at least one tubular heating element being is in direct mechanical contact and is in direct electrical contact with at least one of the first contact area made of metal and the second contact area made of metal.

10. An electric heater in accordance with claim 9, wherein an inner bore or the entire electric heater has an oval, angular, arched, bent, or elliptical geometry.

11. An electric heater in accordance with claim 9, wherein the at least two contact areas made of metal are joined together from different sheet metal or tube segments made of identical or different materials.

12. An electric heater in accordance with claim 9, wherein plates or rings made of metal, mica, plastic or ceramic are arranged at one or both ends of the tubular contact areas made of metal.

13. An electric heater in accordance with claim 9, wherein one or both ends of the tubular contact areas made of metal are sealed with a sealing compound, silicone rubber, epoxy resin or a ceramic cement compound.

14. An electric heater in accordance with claim 9, wherein a plurality of different metal powders are arranged in various chambers formed between the inner metal tube and the outer metal tube.

15. An electric heater in accordance with claim 9, wherein:
- the outer metal tube and the inner metal tube define a connection side through which ends of the heating element pass;
- the heater further comprises an end plate on the connection side connected to the inner metal tube and to the outer metal tube, the ends of the heating element passing through the end plate; and
- the heater further comprises another end plate connected to the inner metal tube and to the outer metal tube on a on side opposite to the connection side.

16. An electric heater for heating surfaces of components, onto which the electric heater is pushed or placed, the electric heater comprising:
- a tubular heating element comprising a tubular metal jacket, one or more heating coils and an electrically insulating core, the one or more heating coils being embedded in the electrically insulating core and being enclosed by the tubular metal jacket;
- an outer metal tube with an outer wall with an outer axially extending recess that extends over an entire axial length of the outer wall, the outer wall defining a first contact area made of metal;
- an inner metal tube with an inner wall with an inner axially extending recess that extends over an entire axial length of the inner wall, the inner metal tube being arranged in the outer metal tube, the inner metal tube having a wall with an interior surface defining a second contact area made of metal with a space between the first contact area made of metal and the second contact area made of metal and with an exterior surface defining a receiving space to receive at least a part of the component to be heated, the tubular metal jacket of the tubular heating element being in electrical contact and direct mechanical contact with the outer metal tube and with the inner metal tube;
- a first axially extending closing surface connecting the outer wall to the inner wall at the edges of the recesses;
- a second axially extending closing surface connecting the outer wall to the inner wall at the edges of the recesses, the first axially extending closing surface and the second axially extending closing surface defining other contact areas connecting the first contact area firmly to the second contact area, the tubular heating element being arranged in the space between the first contact area made of metal and the second contact area made of metal; and
- at least one powder or granular material, the tubular heating element being at least partly embedded in the at least one powder or granular material, the space between the first contact area made of metal and the second contact area made of metal, in which the tubular heating element is arranged, is filled with the powder or granular material, the powder or granular material abutting against at least parts of the first contact area made of metal and the second contact area made of metal.

17. An electric heater in accordance with claim 16, wherein:
- the outer metal tube and the inner metal tube define a connection side through which ends of the heating element pass;
- the heater further comprises an end plate on the connection side connected to the inner metal tube and to the outer metal tube, the ends of the heating element passing through the end plate; and
- the heater further comprises another end plate connected to the inner metal tube and to the outer metal tube on a on side opposite to the connection side.

18. An electric heater in accordance with claim 17, wherein the end plate and the another end plate are made of metal, mica, plastic or ceramic.

19. An electric heater in accordance with claim 9, wherein a plurality of different metal powders are arranged in various chambers formed between the inner metal tube and the outer metal tube.

\* \* \* \* \*